United States Patent [19]

Ohno et al.

[11] Patent Number: 5,840,645
[45] Date of Patent: Nov. 24, 1998

[54] OLEFIN POLYMERIZATION CATALYST AND METHOD FOR THE POLYMERIZATION OF OLEFIN USING SAID OLEFIN POLYMERIZATION CATALYST

[75] Inventors: Ryosuke Ohno, Ichihara; Toshiyuki Tsutsui, Yamguchi, both of Japan

[73] Assignee: Mitsui Petrochemical Industries, Ltd., Tokyo, Japan

[21] Appl. No.: 603,096

[22] Filed: Feb. 20, 1996

Related U.S. Application Data

[63] Continuation of Ser. No. 416,536, Apr. 3, 1995, abandoned, which is a continuation of Ser. No. 101,707, Aug. 4, 1993, abandoned.

[30] Foreign Application Priority Data

Aug. 6, 1992 [JP] Japan .................................. 4-210408
Jun. 17, 1993 [JP] Japan .................................. 5-171256

[51] Int. Cl.⁶ ............................ C08F 4/656; C08F 4/655; C08F 10/00
[52] U.S. Cl. ......................... 502/117; 502/103; 502/120; 526/129; 526/153; 526/348.5; 526/348.6; 526/904
[58] Field of Search .................................. 502/103, 117, 502/120

[56] References Cited

U.S. PATENT DOCUMENTS

| | | | |
|---|---|---|---|
| 5,049,535 | 9/1991 | Resconi et al. | 526/943 |
| 5,234,878 | 8/1993 | Tsutsui et al. | 502/103 |
| 5,252,529 | 10/1993 | Ueda et al. | 502/103 |
| 5,308,816 | 5/1994 | Tsutsui et al. | 502/103 |
| 5,374,696 | 12/1994 | Rosen et al. | 526/943 |

FOREIGN PATENT DOCUMENTS

| | | |
|---|---|---|
| 2071706 | 6/1992 | Canada . |
| 2087916 | 1/1993 | Canada . |
| 2088114 | 1/1993 | Canada . |
| 2101805 | 8/1993 | Canada . |
| 0294942 | 12/1988 | European Pat. Off. . |
| 294942 | 12/1988 | European Pat. Off. . |
| 0553757 | 4/1993 | European Pat. Off. . |
| 553757 | 8/1993 | European Pat. Off. . |

OTHER PUBLICATIONS

Patent Abstracts of Japan vol. 14, No. 578 (C–791) (4521) 21 Dec. 1990 & JP–A–02 252 705 (Idemitsu Kosan Co Ltd) 11 Oct. 1990.

*Primary Examiner*—Edward J. Smith
*Attorney, Agent, or Firm*—Sherman and Shalloway

[57] ABSTRACT

In accordance with the present invention, there are provided an olefin polymerization catalyst comprising an organoaluminum oxy-compound (A), a transition metal compound (B) and a hydrogenated organoaluminum compound (C); a solid olefin polymerization catalyst comprising the above-mentioned components (A), (B), (C) and a carrier (D); a prepolymerized catalyst formed by prepolymerization of olefin on a catalyst component comprising the above-mentioned components (A), (B), (C) and (D); an olefin polymerization catalyst comprising the above-mentioned solid olefin polymerization catalyst or the above-mentioned prepolymerized catalyst and an organoaluminum compound; and a method for the polymerization of olefin which comprises polymerizing olefin in the presence of the above-mentioned catalysts.

26 Claims, 3 Drawing Sheets

OLEFIN POLYMERIZATION CATALYST AND METHOD FOR THE POLYMERIZATION OF OLEFIN USING SAID OLEFIN POLYMERIZATION CATALYST

This application is a continuation of application Ser. No. 08/416,536, filed Apr. 3, 1995 which is a continuation of Ser. No. 08/101,707, filed Aug. 4, 1993, all now abandoned.

FIELD OF THE INVENTION

This invention relates to olefin polymerization catalysts and a method for the polymerization of olefin using the olefin polymerization catalyst. More particularly, the invention relates to the olefin polymerization catalysts which are applicable to suspension polymerization or vapor phase polymerization, thereby olefin polymers excellent in particle properties can be prepared with a high polymerization activity, and the method for the polymerization of olefin using the olefin polymerization catalysts.

BACKGROUND OF THE INVENTION

Titanium-containing catalysts comprising titanium compounds and organoaluminum compounds, or vanadium-containing catalysts comprising vanadium compounds and organoaluminum compounds have heretofore been known to be used as the catalysts for the preparation of α-olefin polymers, for example, ethylene polymer or ethylene/α-olefin copolymer.

Further, olefin polymerization catalysts comprising zirconium compounds and organoaluminum oxy-compounds have been known as the catalysts capable of preparing ethylene/α-olefin copolymers with high polymerization activity. The method for the preparation of ethylene/α-olefin copolymers using such olefin polymerization catalysts have been proposed, for example, in Japanese Patent Laid-Open Publication Nos. 19309/1983 and, 35005/1985, 35006/1985, 35007/1985 and 35008/1985.

Further, Japanese Patent Laid-Open Publication Nos. 260602/1985 and 130604/1985 have proposed methods for the polymerization of olefin by using catalysts formed from transition metal compounds and mixed organoaluminum compounds comprising aluminoxane and organoaluminum compounds.

In these methods cited above, however, large amounts of aluminoxane (organoaluminum oxy-compound) must be used, and hence an improvement in olefin polymerization activity per organoaluminum oxy-compound is desired.

Further, aluminoxane changes in structure and molecular weight depending upon the synthesis conditions employed, and hence its molecular weight and structure each have a distribution. On that account, there is brought about such a problem that when aluminoxane is used as a co-catalyst of a transition metal compound, its activity often varies somewhat, and an improvement in this point is desired. In particular, in the case of supported type catalysts, the particle properties of the prepolymerized olefin polymerization catalyst often change greatly depending upon the aluminoxane used, and hence desired is the advent of catalysts in which the particle properties of the prepolymerized olefin polymerization catalyst or those of the olefin polymer will not change largely depending upon the molecular weight or structure of the aluminoxane used.

OBJECT OF THE INVENTION

The present invention has been made in view of the prior art as mentioned above, and an object of the invention is to provide olefin polymerization catalysts excellent in olefin polymerization activity per organoaluminum oxy-compound, prepolymerized olefin polymerization catalysts excellent in olefin polymerization activity per organoaluminum oxy-compound and also in particle properties, or olefin polymerization catalysts capable of giving olefin polymers excellent in particle properties. The another object of the invention is to provide a process for preparing olefin polymers using the olefin polymerization catalyst or the prepolymerized olefin polymerization catalyst.

SUMMARY OF THE INVENTION

The first olefin polymerization catalyst according to the present invention comprises
 (A) an organoaluminum oxy-compound,
 (B) a transition metal compound of the group IVB metals containing a ligand or ligands having a cyclopentadienyl skeleton, and
 (C) a hydrogenated organoaluminum compound.

The second olefin polymerization catalyst (solid catalyst for olefin polymerization) of the invention comprises
 (A) an organoaluminum oxy-compound,
 (B) a transition metal compound of the group IVB metals containing a ligand or ligands having a cyclopentadienyl skeleton,
 (C) a hydrogenated organoaluminum compound, and
 (D) a particulate carrier.

The third olefin polymerization catalysts of the invention comprises
 the above-mentioned solid catalyst (component) for olefin polymerization, and
 (E) an organoaluminum compound.

The fourth olefin polymerization catalyst (prepolymerization catalyst) of the invention is characterized in that the catalysts are formed by prepolymerizing olefin on a catalyst comprising
 (A) an organoaluminum oxy-compound,
 (B) a transition metal compound of the group IVB metals containing a ligand or ligands having a cyclopentadienyl skeleton,
 (C) a hydrogenated organoaluminum compound, and
 (D) a particulate carrier.

The fifth olefin polymerization catalysts of the invention comprises
 the above-mentioned prepolymerized catalyst (component), and
 (E) an organoaluminum compound.

The process for the polymerization of olefin according to the invention is characterized by polymerizing or copolymerizing olefin in the presence of such olefin polymerization catalysts as mentioned above.

DETAILED DESCRIPTION OF THE INVENTION

Hereinafter, the olefin polymerization catalysts of the present invention and the process for the polymerization of olefin using said catalysts are illustrated in detail.

In the invention, the term "polymerization" sometimes means not only homopolymerization but also copolymerization, and the term "polymer" means likewise not only homopolymer but also copolymer.

Figure 1:
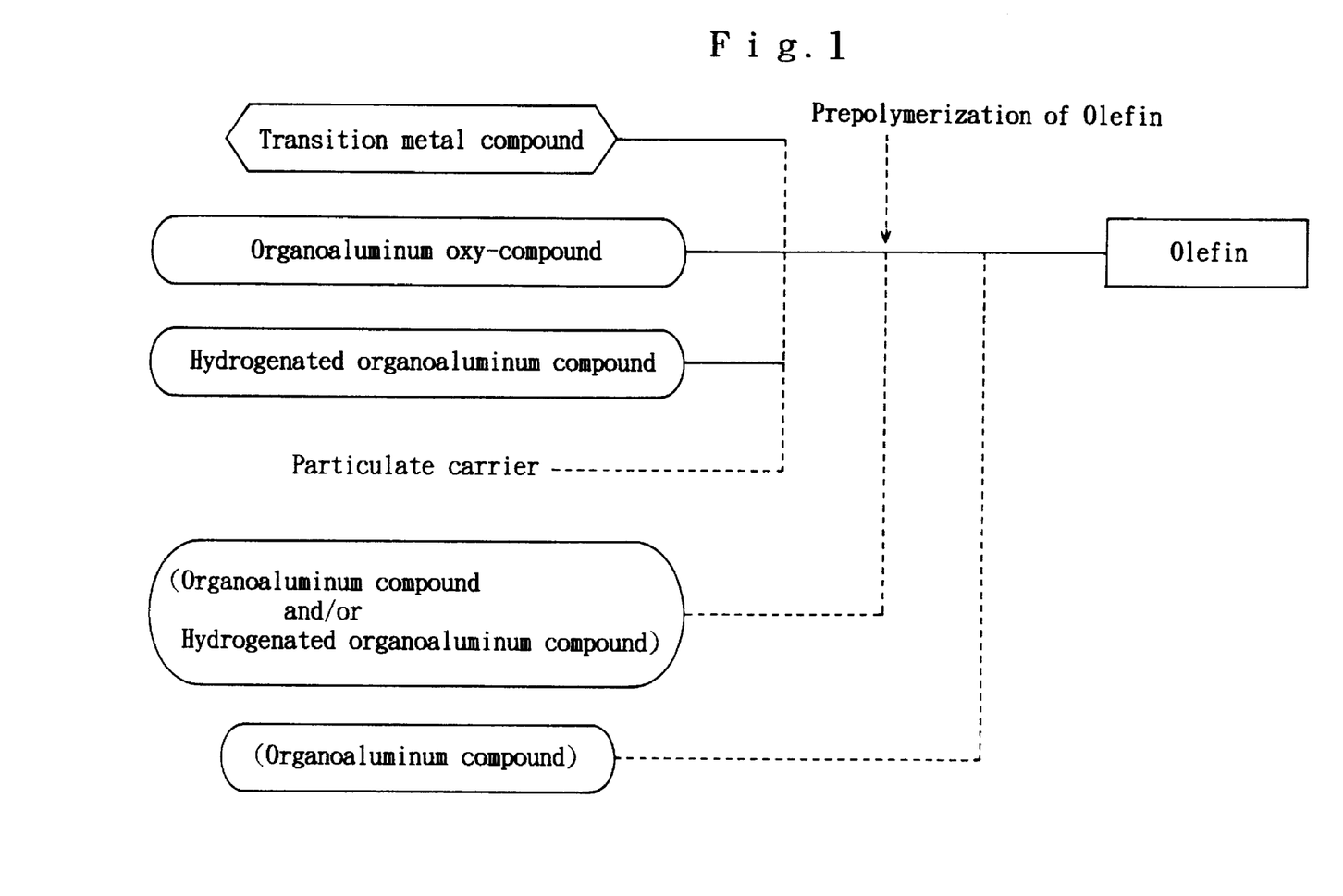
FIG. 1 is a diagram showing a preparation process of the olefin polymerization catalyst of the present invention.

FIG. 1 is a chart showing a process for the preparation of the olefin polymerization catalysts of the invention.

The first olefin polymerization catalyst of the invention comprises (A) an organoaluminum oxy-compound,
(B) a transition metal compound of the group IVB metals containing ligands having a cyclopentadienyl skeleton, and
(C) a hydrogenated organoaluminum compound.

The organoaluminum oxy-compound (A) (hereinafter described sometimes as "the component (A)") used in the invention may be either known aluminoxane (A-1) or such benzene-insoluble organoaluminum oxy-compound (A-2) as disclosed in Japanese Patent Laid-open Publication No. 78687/1990.

The known aluminoxane (A-1) may be prepared, for example, by the method as will be mentioned below.

(1) A method for preparing the aluminoxane (A-1) as its hydrocarbon solution which comprises reacting an organoaluminum compound such as trialkylaluminum with a hydrocarbon medium suspension of hydrate of magnesium chloride, hydrate of copper sulfate, hydrate of aluminum sulfate, hydrate of nickel sulfate or hydrate of serous chloride.

(2) A method for preparing the aluminoxane (A-1) as its hydrocarbon solution which comprises directly reacting water, ice or water vapor with an organoaluminum compound such as trialkylaluminum in such a medium as benzene, toluene, ethyl ether or tetrahydrofuran.

(3) A method for preparing the aluminoxane (A-1) which comprises reacting an organoaluminum compound such as trialkylaluminum with an organotin oxide such as dimethyltin oxide or dibutyltin oxide in such a medium as decane, benzene or toluene.

The aluminoxane (A-1) thus obtained may contain small amounts of organometallic components. Further, after distilling off the solvent or unreacted organoaluminum compound from the solution of aluminoxane as mentioned above, the solid aluminoxane thus obtained may be dissolved again in the solvent.

Organoaluminum compounds which are useful in the preparation of the solution of aluminoxane (A-1) as mentioned above may include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum or tridecylaluminum;

tricycloalkylaluminum such as tricyclohexylaluminum or tricyclooctylaluminum;

dialkylaluminum halide such as dimethylaluminum chloride, diethylaluminum chloride, diethylaluminum bromide or diisobutylaluminum chloride;

dialkylaluminum hydride such as diethylaluminum hydride or diisobutylaluminum hydride;

dialkylaluminum alkoxide such as dimethylaluminum methoxide or diethylaluminum ethoxide; and dialkylaluminum aryloxide such as diethylaluminum phenoxide.

Of these organoaluminum compounds exemplified above, particularly preferred are trialkylaluminum and tricycloalkylaluminum.

Further, isoprenylaluminum represented by the following general formula (i) may also be used as the organoaluminum compound.

$$(i\text{-}C_4H_9)_xAl_y(C_5H_{10})_z \qquad (i)$$

wherein x, y and z are each a positive number, and $z \geq 2x$.

The organoaluminum compounds as mentioned above may be used either singly or in combination.

The solvent used in the preparation of aluminoxane solution may include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cylopentane, cyclohexane, cylooctane and methyl cyclooctane; petroleum fraction such as gasoline, kerosene or gas oil; and hydrocarbon solvents such as halides, particularly chlorides and bromides of the above-mentioned aromatic hydrocarbons, aliphatic hydrocarbons or alicyclic hydrocarbons. In addition, there can also be used ethers such as ethyl ether and tetrahydrofuran.

Of these the aromatic hydrocarbons are particularly preferred.

The benzene-insoluble organoaluminum oxy-compound (A-2) used in the invention may be obtained, for example, by a method in which the solution of aluminoxane (A-1) is brought into contact with water or an active hydrogen containing compound, or a method in which the above-mentioned organoaluminum compound is brought into contact with water.

In the first method for obtaining the benzene-insoluble organoaluminum oxy-compound (A-2), the solution of aluminoxane (A-1) is brought into contact with water or the active hydrogen containing compound.

The active hydrogen containing compound used herein includes alcohols such as methanol, ethanol, n-propanol and isopropanol; diols such as ethylene glycol and hydroquinone; and organic acids such as acetic acid and propionic acid. Of these compounds exemplified above, preferred are alcohols and diols, particularly alcohols.

The water or active hydrogen containing compound to be brought into contact with the solution of aluminoxane (A-1) may be used by dissolving or dispersing the same in hydrocarbon solvents such as benzene, toluene and hexane; ether solvents such as tetrahydrofuran; or amine solvent such as triethylamine, or may be used in a state of vapor or solid. As the water to be brought into contact with the aluminoxane solution, there may also be used water of crystallization of salts such as magnesium chloride, magnesium sulfate, aluminum sulfate, copper sulfate, nickel sulfate, iron sulfate and cerous chloride, or adsorbed water adsorbed on inorganic compounds such as silica, alumina and aluminum hydroxide or polymers.

Contact of the aluminoxane solution and water or active hydrogen containing compound is carried out usually in a solvent, for example, a hydrocarbon solvent.

The hydrocarbon solvent used herein may include the aforementioned hydrocarbons, preferably aromatic hydrocarbons.

In carrying out the contact of the aluminoxane solution with water or active hydrogen containing compound, the water or active hydrogen containing compound is used in an amount of 0.1–5 mols, preferably 0.2–3 mols based on the Al atoms in the aluminoxane solution. The concentration of the aluminoxane in the reaction system is usually $1\times10^{-}$ ~ 5 gram atom/liter, preferably $1\times10^{-2}$~3 gram atom/liter, and the concentration of the water in the reaction system is usually $2\times10^{-4}$~5 mol/liter, preferably $2\times10^{-3}$~3 mol/liter.

The aluminoxane (A-1) solution is brought into contact with water or an active hydrogen containing compound by the following procedures.

(1) The aluminoxane solution is brought into contact with a hydrocarbon solvent containing water or an active hydrogen containing compound.

(2) The vapor of water or an active hydrogen containing compound is blown into the aluminoxane solution, thereby bringing the aluminoxane into contact with said vapor.

(3) The aluminoxane solution is kept directly in contact with water or an active hydrogen containing compound.

(4) The aluminoxane solution is mixed with a hydrocarbon suspension of an adsorbed water containing compound or a water of crystallization containing compound, or with a hydrocarbon suspension of a compound on which an active hydrogen containing compound has been adsorbed, thereby bringing the aluminoxane into contact with the adsorbed water or water of crystallization.

The aluminoxane solution as illustrated above may contain other components so long as they do not exert an aggravating influence upon the reaction between the aluminoxane and the water or the active hydrogen containing compound.

The contact of the aluminoxane solution with water or active hydrogen containing compound is carried out at a temperature of usually $-50°$~$150°$ C., preferably $0°$~$120°$ C. and especially $20°$~$100°$ C. The reaction time, though varies largely depending upon the reaction temperature employed, is usually 0.5~300 hours, preferably 1~150 hours.

In the second method for obtaining the benzene-insoluble organoaluminum oxy-compound (A2), an organoaluminum compound and water are brought into contact with each other. In that case, the water is used in such an amount that the organoaluminum atoms dissolved in the reaction system becomes 20% or less based on the total organoaluminum atoms.

The water to be brought into contact with the organoaluminum compound may be used after dissolving or dispersing said water in a hydrocarbon solvent such as benzene, toluene or hexane, an ether solvent such as tetrahydrofuran, or an amine solvent such as triethylamine, or may be used in a state of water vapor or ice. Further, as the water, there may also be crystallization water such a salt as magnesium chloride, magnesium sulfate, aluminum sulfate, copper sulfate, nickel sulfate, iron sulfate or cerous chloride, or adsorbed water adsorbed on such an inorganic compound as silica, alumina or aluminum hydroxide, or on polymers.

The contact of the organoaluminum compound with water is carried out usually in a hydrocarbon solvent. This hydrocarbon solvent used herein includes the aforementioned hydrocarbon solvents.

Of these solvents mentioned above, particularly preferred are aromatic hydrocarbons.

The concentration in the reaction system of the organoaluminum compound, in terms of aluminum atom, is usually $1\times10^{-3}$~5 gram/liter, preferably $1\times10^{-3}$ ~3 gram atom/liter, and the concentration in the reaction of the water is usually $1\times10^{-3}$~5 mol/liter, preferably $1\times10^{-2}$~3 mol/liter. In that case, it is desirable that the amount of organoaluminum atoms dissolved in the reaction system is 20% or below, preferably 10% or below and especially 0–5%.

The organoaluminum compound may be brought into contact with the water by the following procedures.

(1) The hydrocarbon solution of the organoaluminum is brought into contact with the hydrocarbon solvent containing the water.

(2) The organoaluminum compound and water vapor are brought into contact with each other by blowing the water vapor into a hydrocarbon solution of said organoaluminum compound.

(3) The organoaluminum compound is brought into contact with the adsorbed water or water of crystallization by mixing a hydrocarbon solution of said organoaluminum compound with a hydrocarbon suspension of an adsorbed water containing compound or a water of crystallization containing compound.

(4) A hydrocarbon solution of the organoaluminum compound is brought into contact with ice.

The hydrocarbon solution of the organoaluminum compound as illustrated above may contain other components so long as they do not exert evil influences on the reaction of the organoaluminum compound with water.

The contact of the organoaluminum compound and water is performed at a temperature of usually from $-100°$ to $150°$ C., preferably from $-70°$ C. to $100°$ C. and especially from $-50°$ C. to $80°$ C. The reaction time, though varies largely depending on the reaction temperature employed, is usually 1–200 hours, preferably 2–100 hours.

In the benzene-insoluble organoaluminum oxy-compound (A-2) as illustrated above, the Al component which dissolves in benzene at $60°$ C. is 10% or less, preferably 5% or less in terms of Al atom, and thus the oxy-compound is insoluble or only slightly soluble in benzene.

The solubility of the organoaluminum oxy-compound in benzene is obtained by such a procedure that said organoaluminum oxy-compound corresponding to 100 mg atoms of Al suspended in 100 ml of benzene is mixed at $60°$ C. for 6 hours with stirring, the resulting mixture is filtered at $60°$ C. by means of a G-5 glass filter equipped with a jacket, and the solids portion separated on the filter was rinsed four times with 50 ml of benzene kept at $60°$ C. , followed by measuring the amount (x mmol) of Al atoms presented in the total filtrate (x%).

In the absorbance, as measured by the infrared spectrometry, of the benzene-insoluble organoaluminum oxy-compound (A-2), it is desirable that the ratio $(D_{1260}/D_{1220})$ of the absorbance $(D_{1260})$ in the vicinity of 1260 $cm^{-1}$ to the absorbance $(D_{1220})$ in the vicinity of 1220 $cm^{-1}$ is 0.09 or less, preferably 0.08 or less and especially 0.04–0.07.

In infrared spectrometry of the organoaluminum oxy-compound is conducted in the following manner.

First, the organoaluminum oxy-compound and nujor are ground with an agate mortar in the nitrogen box to a paste. The pasted specimen is then put between KBr plates, and IR spectrum of the specimen is measured in a nitrogen atmosphere by means of an infrared spectrometer IR-810 of Nippon Bunko K.K. From the thus obtained IR spectrum, the $D_{1260}/D_{1220}$ is obtained in the following manner.

(a) The maximum point in the vicinities of 1280 $cm^{-1}$ and 1240 $cm^{-1}$, respectively, are linked together to draw a line which is then taken as a base line L1.

(b) From the minimum absorption point of the transmittance (T%) in the vicinity of 1260 $cm^{-1}$, a perpendicular line is drawn against a wave number axis (axis of abscissae) to read a transmittance ($T_o$%) at an intersection of the perpendicular line and the base line L1, thereby calculating an absorbance ($D_{1260}$=log $T_o/T$) in the vicinity of 1260 cm$^{-1}$.

(c) In the same manner as above, the maximum points in the vicinities of 1280 cm$^{-1}$ and 1180 cm$^{-1}$, respectively, are linked together to draw a line which is then taken as a base line L2.

(d) From the minimum absorption point of the transmittance (T'%) in the vicinity of 1220 cm$^{-1}$, a perpendicular line is drawn against a wave number axis (axis of abscissae) to read a transmittance ($T_o$'%) at an intersection of the perpendicular line and the base line L2, thereby calculating an absorbance ($D_{1220}$=log $T_o$40 /T')

(e) From the value thus obtained, $D_{1266}/D_{1220}$ is calculated.

The benzene-soluble organoaluminum oxy-compound has the $D_{1266}/D_{1220}$ value of about 0.10–0.13, and the benzene-insoluble organoaluminum oxy-compound is apparently different from the prior art benzene soluble organoaluminum oxy-compounds.

The benzene-insoluble organoaluminum oxy-compounds as illustrated above are presumed to have the alkyl oxyaluminum unit (a) represented by the following formula:

wherein $R^1$ represents a hydrocarbon group of 1–12 carbon atoms. The hydrocarbon group taken as $R^1$ in the above formula includes such groups as methyl, ethyl, n-propyl, isopropyl, n-butyl, isobutyl, pentyl, hexyl, octyl, decyl, cyclohexyl and octyl. Of these groups exemplified above, preferred are methyl and ethyl, and particularly preferred is methyl.

In addition to the alkyl oxyaluminum unit (a) of the above formula, the benzene-insoluble organoaluminum oxy-compounds mentioned above may contain an oxyaluminum unit (b) represented by the following formula:

wherein $R^2$ represents a hydrocarbon group of 1–12 carbon atoms, an alkoxy group of 1–12 carbon atoms, an aryloxy group of 6–20 carbon atoms, a hydroxy group, halogen or hydrogen. In that case, however, the groups represented respectively by $R^2$ and $R^1$ in the above mentioned unit (a) are different from each other.

When the benzene-insoluble organoaluminum oxy-compounds as mentioned above contain the oxyaluminum unit (b), it is desirable that said compounds contain the alkyl oxyaluminum unit (a) in the proportion of 30 mol% or more, preferably 50 mol% or more, especially 70 mol% or more.

The transition metal compound (B) (hereinafter called "component (B)" in some cases) of the IVB group metals used in the invention and containing a ligand having a cyclopentadienyl skeleton is represented by the following formula (ii):

$$ML_x \qquad (ii)$$

wherein M represents an atom of a transition metal of the group IVB metals, concretely zirconium, titanium or hafnium, L represents ligands coordinated with a transition metal atom, at least one of the ligands L has a cyclopentadienyl skeleton, and L other than the ligand having a cyclopentadienyl skeleton represents a hydrocarbon group of 1–12 carbon atoms, an alkoxy group, an aryloxy group, an aryloxy group, a trialkylsilyl group, $SO_3R$ group (provided that R is a hydrocarbon group which may have such a substituent as halogen), halogen atom or hydrogen atom, and x is a valence of the transition metal atom.

The ligands having a cyclopentadienyl skeleton are, for example, cyclopentadienyl group, alkyl-substituted cyclopentadienyl groups such as methylcyclopentadienyl, dimethylcyclopentadietyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylpentadienyl, or indenyl group, 4,5,6,7-tetrahydroindenyl group and fluorenyl group. These groups as exemplified above may be substituted with a halogen atom or trialkylsilyl group.

Of the ligands coordinated with the transition metal atom, particularly preferred is an alkyl-substituted cyclopentadienyl group.

When the compound represented by the general formula (ii) contains 2 or more ligands each having a cyclopentadienyl skeleton, the two ligands out of those having a cyclopentadienyl skeleton may be linked together through an alkylene group such as ethylene or propylene, a substituted alkylene group such as isopropylidene or diphenylmethylene, a silylene group or a substituted silylene group such as dimethylsilylene, diphenylsilylene or methylphenylsilylene.

The ligands L other than those having a cyclopentadienyl skeleton may include those mentioned below.

The hydrocarbon group of 1–12 carbon atoms includes such group as alkyl, cycloalkyl, aryl or aralkyl, and more particularly, the alkyl group includes methyl, ethyl, propyl, isopropyl or butyl; the cycloalkyl group includes cyclopentlyl or cyclohexyl; the aryl group includes phenyl or tolyl; and the aralkyl group includes benzyl or neophyl.

Further, the alkoxy group includes methoxy, ethoxy or butoxy; aryloxy group includes phenoxy; the ligand represented by $SO_3R$ includes p-toluenesulfonate, methanesulfonate or trifluoromethanesulfonate; and the halogen includes fluorine, chlorine, bromine or iodine.

When the valence of the transition metal atom is, for example, 4, the transition metal compound (B) containing ligands having a cyclopentadienyl skeleton is represented by the following formula (ii') in more detail.

$$R^3_a R^4_b R^5_c R^6_d M \qquad (ii')$$

wherein M represents the same transition metal atom as in the formula (ii), $R^3$ represents a group (ligand) having a cyclopentadienyl skeleton, $R^4$, $R^5$ and $R^6$ each represent a group having a cyclopentadienyl skeleton, alkyl group, cycloalkyl group, aryl group, aralkyl group, alkoxyl group, aryloxy group, trialkylsilyl group, $SO_3R$ group, halogen atom or hydrogen atom, a is an integer of 1 or more, and a+b+c+d=4.

In the present invention, there is used preferably a metallocene compound having the above-mentioned formula (ii') in which at least one of $R^4$, $R^5$ and $R^6$ are the groups (ligands) having a cyclopentadienyl skeleton, for example, $R^3$ and $R^4$ are the groups (ligands) having a cyclopentadienyl.

The groups having a cyclopentadienyl skeleton mentioned above may be linked together through an alkylene group such as ethylene or propylene, a substituted alkylene group such as isopropylene or diphenylmethylene, a silylene group or a substituted silylene group such as dimethylsilylene, diphenylsilylene or methylphenylsilylene.

Further, $R^5$ and $R^6$ in the above-mentioned formula (ii') are each a group having a cyclopentadienyl skeleton, alkyl group, cycloalkyl group, aryl group, arlakyl group, alkoxyl group, aryloxy group, trialkylsilyl group, $SO_3R$ group, halogen atom or hydrogen atom.

Exemplified below are the transition metal compounds (B) of the formula (ii') wherein M is zirconium.

Bis(indenyl)zirconium dichloride,
Bis(indenyl)zirconium dibromide,
Bis(indenyul)zirconium bis(p-toluenesulfonate),
Bis(4,5,6,7-tetrahydroindenyl)zirconium dichloride,
Bis (fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl) zirconium dichloride,
Dimethylsilylenebis(indenyl)zirconium dichloride,
Dimethylsilylenebis(indenyl)zirconium bis(trifluoromethane-sulfonate),
Dimethylsilylenebis(4,5,6,7-tetrahydroindenyl)zirconium dichloride,
Dimethylsilylene(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis(trifluoromethanesulfonate),
Bis(ethylcylopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcylcopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopetnadienyl)zirconium dichloride.

In the compounds exemplified above, the di-substituted cyclopentadienyl ring includes 1,2- and 1,3-substituted compounds, and the tri-substituted cyclopentadienyl ring includes 1,2,3- and 1,2,4-substituted compounds. Further, the alkyl group such as propyl or butyl includes isomer such as n-, i-, sec-, tert-compounds, In the present invention, the above-exemplified zirconium compounds in which the zirconium has been replaced by titanium or hafnium can also be used as the transition metal compounds (B).

These transition meal compounds as illustrated above may be used either singly or in combination of two or more, or may be used by diluting them with hydrocarbons or halogenated hydrocarbons.

In the present invention, preferably used as the transition metal compounds (B) are zirconocene compounds in which the central metal atom is zirconium and at least two ligands having a cyclopentadienyl skeleton are contained.

The hydrogenated organoaluminum compounds (C) used in the invention are represented by the following formula (iii).

$$H_nAlR^7{}_{3-n}$$

wherein $R^7$ represents an alkyl group, cycloalkyl or aryl group, and n is 1 or 2.

The hydrogenated organoaluminum compounds (C) as illustrated above include concretely such compounds as listed below.

Dimethylaluminum hydride, diethylaluminum hydride, dihydrophenylaluminum, diisopropylaluminum hydride, di-n-butyl-aluminum hydride, diisobutylaluminum hydride, diisohexylaluminum hydride, diphenylaluminum hydride, dicyclohexylaluminum hydride, di-sec-heptylaluminum hydride, di-sec-nonylaluminum hydride, etc.

Of these compounds exemplified above, preferred is dialkylaluminum hydride, and particularly preferred is diisobutylaluminum hydride.

The second olefin polymerization catalysts of the represent invention are solid catalysts for olefin polymerization comprising the above-mentioned organoaluminum oxycompound (A), the transition metal compound of the group IV metals containing a ligand having a cyclopentadienyl skeleton (B), the hydrogenated organoaluminum compound (C), and a particulate carrier (D).

The particulate carrier (D) used herein includes such carriers as listed below.

Natural porous minerals such as acid clay, diatomaceous earth and pumice; inorganic oxides such as alumina, silica, silica alumina, titania and magnesium; zeolite (crystalline aluminosilicate) such as mordenite or erionite; compounds having a layer structure such as montmorillonite, vermiculite, zirconium phosphate, fluorotetrasilicate and mica; carbon carriers such as graphite and activated carbon; and organic compound carriers such as divinyl benzene-crosslinked polystyrene and polyacrylic acid esters.

Of the carrier compounds exemplified above, preferred are the inorganic oxides.

The particulate carrier (D) used in the invention has an average particle diameter of usually 0.1–200 $\mu$m, preferably 1–100 $\mu$m, a specific surface area of usually 50–1,000 m$^2$/g, preferably 100–700 m$^2$/g, and a pore volume of preferably 0.3–2.5 cm$^3$/g.

It is also desirable that this particulate carrier (D) has an amount of adsorbed water of less than 1.0% by weight, preferably less than 0.5% by weight, and a surface hydroxyl group in an amount of 1.0% by weight or more, preferably 1.2–4.0% by weight and especially 1.5–3.0% by weight.

The amount of adsorbed water (% by weight) and that of the surface hydroxyl group are obtained by the following procedures.

(Amount of adsorbed water)

The specimen is dried at a temperature of 200° C., an ordinary pressure and in a nitrogen stream for 4 hours to measure a weight loss which is then taken as the amount of adsorbed water.

(Surface hydroxyl group)

The weight measured by drying the carrier at a temperature of 200° C., an ordinary pressure in a nitrogen stream for 4 hours is taken as X (g), and the carrier as dried is then calcined at a temperature of 1,000° C. for 20 hours to obtain a calcined product from which the surface hydroxyl groups have disappeared, and the weight of the calcination product as measured is taken as Y (g). The amount of the surface hydroxyl groups is calculated on the basis of the following equation.

Surface hydroxyl group (wt %)={(X−Y)/X}×100

The use of the particular carrier (D) having such a specific amount of adsorbed water and the surface hydroxyl groups come to obtain olefin polymerization catalysts capable of preparing olefin polymers excellent in particle properties with high polymerization activity.

The third olefin polymerization catalysts of the invention comprises the solid catalyst formed from the aforementioned catalyst components (A)–(D), and an organoaluminum compound (E).

The organoaluminum compounds (E) used in the invention include, for example, those represented by the following formula (iv).

$$R^7_n Al\ X_{3-n} \qquad (iv)$$

wherein R$^7$ represents a hydrocarbon group of 1–12 carbon atoms, X represents halogen, and n is 1–3.

In the above-mentioned formula (iv), R$^7$ is a hydrocarbon group of 1–12 carbon atoms, for example, alkyl, cycloalkyl or aryl, and more particularly include methyl, ethyl, n-propyl, isopropyl, isobutyl, pentyl, hexyl, octyl, cyclopentyl, cyclohexyl, phenyl and tolyl.

Such organoaluminum compounds as used herein include those as listed below.

Trialkylaluminum such as trimethylaluminum, triethylaluminum, triisopropylaluminum, triisobutylaluminum, trioctylaluminum, tri-2-ethylhexylaluminum, etc; alkenylaluminum such as isoprenylaluminum etc.; dialkylaluminum halides such as dimethylaluminum chloride, diethylaluminum chloride, diisopropylaluminum chloride, diisobutylaluminum chloride, dimethylaluminum bromide, etc; alkylaluminum sesquihalides such as methylaluminum sesquichloride, ethylaluminum sesquichloride, ispropylaluminum sesquichloride, butylaluminum sesquichloride, ethylaluminum sesquibromide, etc.; and alkylaluminum dihalides such as methylaluminum dichloride, ethylaluminum dichloride, isopropylaluminum dichloride, ethylaluminum dibromide, etc.

The compounds represented by the following formula (v) can also be used as the organoaluminum compounds (E).

$$R^7_n Al\ Y_{3-n} \qquad (v)$$

wherein R$_7$ is the same as defined in the above formula (iv), Y represents —OR$^8$, —OSiR$^9_3$, —OAlR$^{10}_2$, —NR$^{11}_2$, —SiR$^{12}_3$ or —N(R$^{13}$) AlR$^{14}_2$, n is 1–2, R$^8$,R$^9$ and R$^{14}$ each represent methyl, ethyl, isopropyl, isobutyl, cyclohexyl, phenyl or trimethylsilyl, R$^{11}$ represents hydrogen atom, methyl, ethyl, isopropyl, phenyl or trimethylsilyl, and R$^{12}$ and R$^{13}$ each represent methyl or ethyl.

The organoaluminum compounds of the formula (v) used herein include such compounds as enumerated below.

(1) The compound represented by R$^7_n$ Al(OR$^8$)$_{3-n}$ including, for example, dimethylaluminum methoxide, diethylaluminum ethoxide, diisobutylaluminum methoxide, etc., (2) the compound represented by R$^7_n$Al(OSiR$^9_3$)$_{3-n}$ including, for example, Et$_2$Al(OSiMe$_3$), (iso-Bu)$_2$Al(OSiMe$_3$), (iso-Bu)$_2$Al(OSiEt$_3$), etc., (3) the compound represented by R$^7_n$Al(OAlR$^{10}_2$)$_{3-n}$ including, for example, Et$_2$AlOAlEt$_2$, (iso-Bu)$_2$AlOAl(iso-Bu)$_2$, etc., (4) the compound represented by R$^7_n$Al (NR$^{11}_2$)$_{3-n}$ including, for example, Me$_2$AlNEt$_2$, Et$_2$AlNHMe, Me$_2$AlNHEt, Et$_2$AlN(SiMe$_3$)$_2$, (iso-Bu)$_2$AlN(SiMe$_3$)$_2$, etc.

(5) the compound represented by R$^7_n$Al(SiRl$^2_3$)$_{3-n}$ including, for example, (iso-Bu)$_2$AlSiMe$_3$, etc., and (6) the compound represented by R$^7_n$Al(N (R$^{13}$) AlR$^{14}_2$)$_{3-n}$ including, for example, Et$_2$AlN(Me)AlEt$_2$, (iso-Bu)$_2$AlN (Et)Al(iso-Bu)$_2$.

Of the organoaluminum compounds represented by the above-mentioned formulas (iv) and (v), respectively, preferred are those represented by the formula R$^7_3$Al, R$^7_n$Al (OR$^8$)$_{3-n}$ and R$^7_n$Al(OAlRl$^{10}_2$)$_{3-n}$, respectively, and particularly preferred are those in which R$^7$ is an isoalkyl group and n=2. These organoaluminum compounds may also be use as a mixture of two or more.

The first olefin polymerization catalysts of the invention comprises the above-mentioned catalyst components (A), (B) and (C). These catalyst components may be added, as they are, to the polymerization system, however, it is desirable that they are brought into contact beforehand into contact by mixing with one another, followed by addition to the polymerization system.

The contact of the components (A),(B) and (C) may be performed in an inert solvent, and said components may be brought into contact with one another in any order.

In practicing the contact of the catalyst components (A), (B) and (C), the transition metal compound (B) is used in an amount of usually about 10$^{-4}$~2×10$^{-2}$ mol/liter-solvent, preferably 2×10$^{-4}$~10$^{-2}$ mol/liter-solvent. The organoaluminum oxy-compound (A) is used in an amount of usually 10–500, preferably 20–200 in terms of the gram atom ratio (Al/transition metal) of the aluminum atom in the compound (A) to the transition metal in the transition metal compound (B). The hydrogenated aluminum oxy-compound (C) is used in an amount of usually 0.01–3, preferably 0.05–2.0 in terms of the gram atom ratio (Al-C/Al-A) of the aluminum atom (Al-A) in the compound (C) to the aluminum atom (Al–A) in the organoaluminum oxy-compound (A).

The contact temperature of the catalyst components (A), (B) and (C) is usually from −50° C. to 200° C., preferably from −20° to 150° C., and the contact time is 1–3,000 minutes, preferably 5–1,200 minutes. At the time of practicing the contact of these catalyst components by mixing, the mixing time may be varied.

The second olefin catalysts of the invention are formed by bringing the above-mentioned catalyst components (A), (B), (C) and (D) into contact (mixing) with one another.

In practicing the contact of the catalyst components (A), (B), (C) and (D), these components are brought into contact with one another in any order, however, preferably the particulate carrier (D) and the organoaluminum oxy-compound (A) are brought into contact by mixing with each other, followed by contact with the hydrogenated organoaluminum compound (C) and the transition metal compound (B) of the group IVB metals containing a ligand having a cyclopentadienyl skeleton in that order, or the particulate carrier (D) and the organoaluminum oxy-compound (A) are brought into contact by mixing with each other, followed by contact with the transition metal compound (B) of the group IVB metals containing a ligand having a cyclopentadienyl skeleton and the hydrogenated organoaluminum compound (C) in that order.

In practicing the contact of the catalyst components (A), (B), (C) and (D), the transition metal compound (B) is used in an amount of usually about $10^{-4}18$ $2 \times 10^{-2}$ mol/liter-solvent, preferably $2 \times 10^{-4} \sim 10^{-2}$ mol/liter-solvent. The transition metal compound (B) is used in an amount of usually $5 \times 10^{-6} \sim 5 \times 10^{-}$mol, preferably $10^{-5} \sim 2 \times 10^{-4}$ mol based on 1 g of the particulate carrier (D). The organoaluminum oxy-compound (A) is used in an amount of usually 10–500, preferably 20–200 in terms of the gram atom ratio (Al/transition metal) of aluminum atoms in the compound (A) to transition metal atoms in the transition metal compound (B). The organoaluminum oxy-compound (A) is also used in an amount of usually 0.1–0.4, preferably 0.15–0.3 in terms of the gram atom ratio (OH/Al-A) of the surface hydroxyl group (OH) of the particulate carrier (D) to aluminum (Al-A) of the organoaluminum oxy-compound (A). The hydrogenated organoaluminum compound (C) is used in an amount of usually 0.01–3, preferably 0.05–2.0 in terms of the gram atom ratio (Al-C/Al-A) of aluminum atoms (Al-C) in said compound (C) to aluminum atoms (Al-A) in the organoaluminum oxy-compound (A).

In practicing the contact of the catalyst components (A), (B), (C) and (D), the contact temperature employed is usually from −50° to 200° C., preferably from −20° to 150° C., and the contact time employed is 1–3,000 minutes, preferably 5–1,200 minutes. In particular, the temperature at which the components (A) and (D) are brought into contact with each other is usually 30°–200° C., preferably 60°–150° C. At the time of practicing the contact of these catalyst components, the mixing time employed may be varied.

In the second olefin polymerization catalysts (solid catalysts for olefin polymerization), it is desirable that the transition metal atoms derived from the transition metal compound (B) are carried in an amount, based on 1 g of the particulate carrier (D), of usually about $5 \times 10^{-6} \sim 5 \times 10^{-4}$ gram atom, preferably $10^{-5} \sim 2 \times 10^{-4}$ gram atom on said carrier (D), and the aluminum atoms derived from the organoaluminum oxy-compound (A) and the hydrogenated organoaluminum compound (C), respectively, are carried in an amount of usually about $2 \times 10^{-4} \sim 2 \times 10^{-1}$ gram atom, preferably $2 \times 10^{-3} \sim 5 \times 10^{-2}$ gram atom on said carrier (D).

The third olefin polymerization catalysts of the invention comprise the above-mentioned solid catalyst (component) for olefin polymerization and the organoaluminum compound (E).

The fourth olefin polymerization catalysts of the invention are prepolymerized olefin polymerization catalysts formed by prepolymerization of olefin on a catalyst component comprising the catalyst components (A), (B), (C) and (D).

The prepolymerized olefin polymerization catalysts are obtained by prepolymerization of olefin in the presence of the catalyst components (A), (B), (C), and (D). Usually, however, the prepolymerization of olefin is carried out in the presence of the above-mentioned solid catalyst (component) for olefin polymerization, or in the presence of a solid catalyst component comprising the above-mentioned catalyst components (A), (B) and (D), and the catalyst component (C).

The solid catalyst component is prepared by contacting components (A), (B) and (D) in an inert solvent in a similar manner as that of the solid catalyst.

In practicing the prepolymerization, the transition metal compound (B) is used in an amount of usually $10^{-6} \sim 2 \times 10^{-2}$ mol/liter (polymerization volume), preferably $5 \times 10^{-5} \sim 10^{-2}$ mol/liter, and this transition metal compound (B) is used in an amount, based on 1 g of the particulate carrier (D), of usually $5 \times 10^{-6} \sim 5 \times 10^{-4}$ mol, preferably $10^{-5} \sim 2 \times 10^{-4}$ mol as transition metal. The organoaluminum oxy-compound (A) is used in an amount of usually 10–500, preferably 20–200 in terms of the atomic ratio (Al/transition metal) of aluminum of said compound (A) to transition metal of the transition metal compound (B). The hydrogenated organoaluminum compound is used in an amount of usually 0.01–3, preferably 0.05–2 in terms of the atomic ration (Al-C/Al-A) of aluminum atom (Al-C) of the compound (C) to aluminum atom (Al-A) of the organoaluminum oxy-compound (A).

In that case, the organoaluminum compound (E) may be used, if necessary. When the organoaluminum compound (E) is used, the amount of the compound (E) used is usually not more than 200 mols, preferably 3–150 mols based on 1 g of transition metal atom in the transition metal compound (B).

When the prepolymerization is carried out in the presence of the aforementioned solid catalyst (component) for olefin polymerization is used in an amount of usually $10^{-6} \sim 2 \times 10^{-2}$ mol/liter (polymerization volume), preferably $5 \times 10^{-5} \sim 10^{-2}$ mol/liter in terms of the transition metal compound (B).

In that case, the hydrogenated organoaluminum compound (C) and/or the organoaluminum compound (E) may be used. When the compound (C) and/or (E) are used, these aluminum compounds are used in an amount of usually not-more than 200 mols, preferably 3–150 mols based on 1 gram atom of transition metal in the transition metal compound (B).

When the prepolymerization is carried out in the presence of the above-mentioned solid catalyst component and the component (C), said solid catalyst component is used in an amount of usually $10^{-6} \sim 2 \times 10^{-2}$ mol/liter (polymerization volume), preferably $5 \times 10^{-5} \sim 10^{-2}$ mol/liter in terms of the transition metal compound (B), and the hydrogenated organoaluminum compound (C) is used in an amount of usually 0.01–3, preferably 0.05–2 in terms of the atomic ration (Al-C/Al-A) of aluminum atom (Al-C) of said compound (C) to aluminum atom (Al-A) of the component (A) in said solid catalyst component.

In that case, the organoaluminum compound (E) may also be used. When this organoaluminum compound (E) is used, the amount of said compound (E) used is not more than 200 mols, preferably 3–150 mols based on 1 g of transition metal atoms in the transition metal compound (B).

The polymerization temperature employed is usually from −20° to 80° C., preferably 0°–50° C., and the prepolymerization time employed is usually 0.5–100 hours, preferably 1–50 hours.

In practicing the prepolymerization, there maybe used the same olefin as used at the time of polymerization mentioned later, however, preferred are those consisting essentially of ethylene.

The prepolymerization may be carried out by any of the batchwise, semi-continuous and continuous methods.

The prepolymerized polymerization catalysts of the invention thus prepared desirably contain the polymer formed at the time of prepolymerization in an amount of usually about 0.1–500 g, preferably 0.03–300 g and especially 1–100 g based on 1 g of the particulate carrier (D).

The fifth olefin polymerization catalysts of the invention comprise the prepolymerized polymerization catalyst (component) as mentioned above and the organoaluminum compound (E).

In the invention the olefin polymerization catalysts may also contain other components useful for olefin polymerization in addition to the components as mentioned hereinabove.

The olefin polymerization catalysts of the invention are capable of polymerizing olefin with excellent polymerization activities, even when the content of the organoaluminum oxy-compound is small.

Further, the prepolymerized polymerization catalysts of the invention are excellent in particle properties in comparison with the prior art prepolymerized polymerization catalysts.

When olefins are polymerized by the use of the olefin polymerization catalysts, particularly the prepolymerized polymerization catalysts, olefin polymers excellent in particle properties may be prepared.

The method for olefin polymerization of the invention is to polymerize or copolymerize olefins in the presence of the olefin polymerization catalysts as illustrated hereinbefore.

The olefin used at the time of polymerization includes α-olefin of 2–20 carbon atoms, concretely ethylene, propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, etc.

Further, there may also be used cyclopentene, cycloheptene, norbornene, 5-methyl-2-norbornene, tetracyclododecene, 2-methyl-1,4,5,8-dimethano-1,2,3,4,4a,5,8,8a-octahydronaphthalene, styrene, vinylcyclohexane, dienes, etc.

In practicing the polymerization, it is desirable that the olefin polymerization catalyst is used in an amount of usually $10^{-8} \sim 10^{-3}$ gram atom, preferably $10^{-7} \sim 10^{-4}$ gram atom per 1 liter of polymerization volume in terms of transition metal atoms in the transition metal compound (B).

The organoaluminum compound (E) used together with the solid catalyst or the prepolymerized polymerization catalyst is used in an amount of 0–500 mols, preferably 5–200 mols per 1 gram atom of the transition metal atom.

In practicing the polymerization, there are used further the aforementioned organoaluminum oxy-compound (A) and hydrogenated organoaluminum compound (C), if necessary. It is desirable that such aluminum compounds as mentioned above are used in an amount of 0–500 mols, preferably 5–200 mols per 1 gram atom of the transition metal atom.

In the invention, the polymerization may be carried out according to the liquid phase polymerization or the vapor phase polymerization.

When the polymerization is carried out according to the liquid phase polymerization, there may be used as the polymerization solvent aliphatic hydrocarbons such as propane, butane, pentane, hexane, heptane, octane, decane, dodecane, kerosene, etc.; alicyclic hydrocarbons such as cyclopentane, cyclohexane, methylcyclopentane, etc.; aromatic hydrocarbons such as benzene, toluene, xylene, etc.; and halogenated hydrocarbons such as ehtylenechloride, chlorobenzene, dichloromethane, etc. These solvents exemplified above may be used either singly or in combination. Further, it is also possible to the olefin itself as a solvent.

In the present invention, the temperature at which the polymerization of olefins is carried out in the presence of the aforementioned olefin polymerization catalysts is usually from −50° to 150° C., preferably 0°–100° C., The pressure under which the polymerization is carried out usually from normal pressure to 50 kg/cm$^2$.

The polymerization may be carried out by any of the batchwise, semi-continuous and continuous methods. Further, the polymerization may also be carried out in two or more stages under the reaction conditions different from one another.

The molecular weight of the olefin polymer thus obtained may be modified by allowing hydrogen to exist in the polymerization system, or by varying the polymerization temperature employed.

EFFECT OF THE INVENTION

The olefin polymerization catalysts of the present invention comprise the aluminum oxy-compound, the transition metal compound of the group IVB metals containing a ligand having a cylopentadienyl skeleton, the hydrogenated organoaluminum aluminum compound and preferably a particulate carrier, and hence are capable of polymerizing the olefin with excellent polymerization activities.

The prepolymerized olefin polymerization catalysts of the invention are excellent in polymerization activities as well as in particle properties.

Further, the olefin polymers prepared by using the olefin polymerization catalysts are excellent in particle properties. The method for olefin polymerization is capable of preparing olefin polymers in high yields because the olefins are polymerized in the presence of such olefin polymerization catalysts as illustrated hereinbefore. Further, by the use of the catalysts of the present invention, it becomes possible to perform a long-term stable operation of vapor phase polymerization to obtain polyolefins, preferably polyethylene especially straight chain low density polyethylene.

The present invention is illustrated below in more detail with reference to examples. It should be construed that the invention is in no way limited to those examples.

In the following examples, MFR of the ethylene copolymers obtained was measured at 190° C. under a load of 2.16 kg.

The density was measured by means of a density gradient tube using the strand obtained at the time of measuring MFR at 190° C. under a load of 2.16 kg which was heat treated at 120° C. for 1 hour, followed by cooling gradually to room temperature over a period of 1 hour.

Average particle diameter of the polymers obtained and the content of the particulate polymers having a particle diameter of not more than 100 μm were measured by means of a sieve.

Example 1

[Preparation of prepolymerized polymerization catalyst (1)]

A thoroughly nitrogen-purged 1-liter glass flask was charged with 34.5 g of silica (a product of Fuji Davison Co., amount of adsorbed water; not more than 0.1% by weight, content of hydroxyl group; 2.4% by weight) and 500 ml of toluene to obtain a suspension which was then cooled at 0° C. To this suspension was added dropwise while keeping the temperature within the system at 0° C. 182 ml of a toluene solution of an organoaluminum oxy-compound (a product of Schering Co., aluminoxane (Lot No. TB6-49), Al; 1.45 mol/liter) over a period of 45 minutes. Thereafter, the suspension was elevated in temperature to 95° C. and allowed to react for 20 hours, followed by washing three times with toluene and adding toluene to make a suspension of 700 ml.

A 50 ml portion of the thus obtained suspension was poured into a 200 ml glass flask, and the flask was then charged with 100 ml of toluene and 3.4 ml of a toluene solution (Zr; 0.0303 mol/liter) of bis(1-methyl-3-n-butylcyclopentadienyl)zirconium dichloride, followed by elevating in temperature to 80° C. and stirring for 2 hours. This suspension was washed three times with 200 ml of hexane, and the suspension was brought up to 200 ml with the addition of hexane.

Subsequently, 7.7 ml of a decane solution of diisobutylaluminum hydride (Al; 1.0 mol/liter) and 1.4 ml of 1-hexene were added to this suspension, and the prepolymerization was carried out at 35° C. for 5 hours introducing continuously ethylene under atmospheric pressure to obtain a suspension of a prepolymerized polymerization catalyst (1). In that case, no adhesion of the prepolymerization catalyst to the reactor wall was observed.

Figure 2:
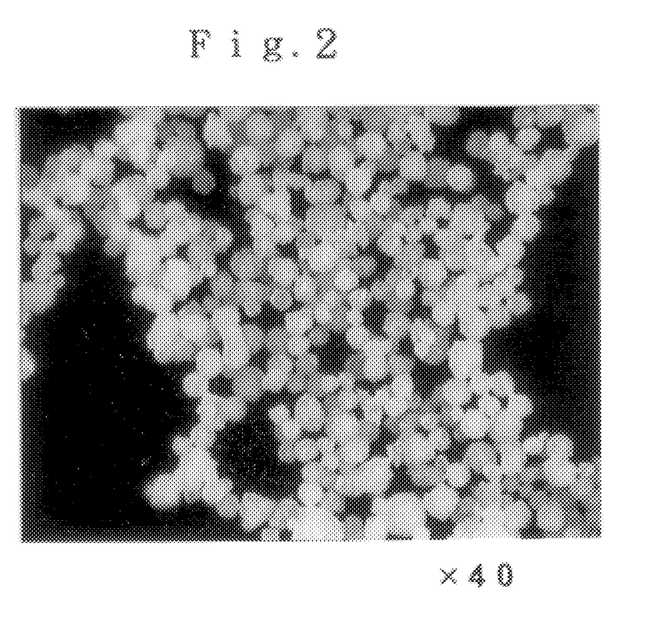
FIG. 2 is a photograph of an optical microscope showing a particle structure of the prepolymerized catalyst (component) obtained in Example 1 of the invention.

The prepolymerized polymerization catalyst (1) thus obtained contained, based on 1 g of silica, 3.5 mg of zirconium, 224 mg of aluminum and 10 g of an ethylene/1-hexene copolymer. This prepolymerized polymerization catalyst was spherical, and a photograph of an optical microscope thereof was shown in FIG. 2.

In the polymerization mentioned later, this suspension of the prepolymerized polymerization catalyst (1) was used, as it was.

(Polymerization)

A thoroughly nitrogen-purged 2-liter stainless steel autoclave was charged with 150 g of sodium chloride (a special grade product of Wako Junyaku K.K.), followed by vacuum drying at 90° C. for 1 hour. Thereafter, a mixed gas (1-butene content; 5.0 mol%) of ethylene and 1-butene was introduced into the autoclave, thereby bringing back to normal pressure and maintaining the temperature in the system at 75° C.

Subsequently, 0.5 ml of a decane solution of triisobutylaluminum (Al; 1.0 mol/liter) and further 10 ml of a suspension (0.005 mg atom in terms of zirconium atom) of the prepolymerized polymerization catalyst (1) as prepared above were added to the autoclave.

Thereafter, the above-mentioned mixed gas of ethylene and 1-butene was introduced into the autoclave to initiate polymerization at a total pressure of 8 kg/cm²-G. The temperature within the system rose immediately to 80° C. Thereafter, only the above-mentioned mixed gas is replenished while maintaining the total pressure at 8 kg/cm²-G, and polymerization was carried out at 80° C. for 90 minutes.

After the completion of the polymerization, the sodium chloride was removed by water washing, and the remaining polymer was washed with methanol, followed by vacuum drying at 80° C. overnight.

Thus, there was obtained 433 g of an ethylene/1-butene copolymer.

The ethylene/1-butene copolymer thus obtained had MFR of 0.6 g/10 min, a density of 0.910 g/cm³, a bulk specific gravity of 0.48 g/cm³, an average particle diameter of polymer of 700 μm, and a content of particulate polymer having a particle diameter of not more than 100 μm of 0.04% by weight.

Example 2

[Preparation of prepolymerized polymerization catalyst]

The same procedure as in Example 1 was repeated except that the amount of the decane solution (Al; 1.0 m/liter) of diisobutylaluminum hydride used was changed to 3.9 ml, whereby a prepolymerized polymerization catalyst was obtained. The prepolymerized polymerization catalyst thus obtained was spherical in shape.

(Polymerization)

Thereafter, the same procedure as in Example 1 was repeated except that the above-obtained prepolymerized polymerization catalyst was used, whereby 328 g of an ethylene/1-butene copolymer.

The ethylene/1-butene copolymer thus obtained had MFR of 0.7 g/10 min, a density of 0.910 g/cm³, a bulk specific gravity of 0.48 g/cm³, a polymer average particle diameter of 650 μm, and a content of particulate polymer having a particle diameter of not more than 100 μm of 0.06% by weight.

Example 3

[Preparation of prepolymerized polymerization catalyst (2)]

A thoroughly nitrogen-purged 1 liter glass flask was charged with 34.5 g of silica (a product of Fuji Davison Co., adsorbed water; not more than 0.1% by weight, hydroxyl group content; 3.3% by weight) and 500 ml of toluene, and the mixture in a suspended state was cooled to 0° C. To this suspension, while maintaining the temperature within the system at 0° C., was added dropwise over a period of 45 minutes 66 ml of a toluene solution of organoaluminum oxy-compound (a product of Schering Co., methylaluminoxane, Al; 4.00 mol/liter) over a period of 45 minutes. Thereafter, this suspension was heated up to 95° C. to react for 4 hours, and the reaction mixture was washed three times with toluene to obtain 700 ml of a suspension with the addition of toluene.

A 50 ml portion of the thus obtained suspension was poured into a 200 ml glass flask which was then charged with 100 ml of toluene, 1.4 ml of a toluene solution (Al; 1 mol/liter) of diisobutylaluminum hydride, and the resulting suspension was heated up to 95° C. to react for 4 hours. Thereafter, this suspension was washed three times with 200 ml of toluene to obtain a suspension of 150 ml with the addition of toluene.

Subsequently, this suspension was charged with 3.6 ml of a toluene solution (Zr; 0.0303 mol/liter) of bis(1-methyl-3-n-butylcyclopentadienyl) zirconium dichloride, and was heated up to 80° C. and the resulting mixture was stirred for 2 hours at 80° C. This suspension was washed three times with 200 ml of hexane to obtain 200 ml of a suspension with the addition of hexane.

To this suspension were added 8.1 ml of a decane solution (Al; 1.0 mol/liter) of triisobutylaluminum and 1.4 ml of 1-hexene, and ethylene gas (normal pressure) was continuously introduced into said suspension to carry out prepolymerization at 35° C. for 5 hours, whereby a prepolymerized catalyst (2) was obtained. In that case, no adhesion of a prepolymerized catalyst to the reactor wall was observed.

The prepolymerized catalyst (2) contained, based on 1 g of silica, 3.6 mg of zirconium, 228 mg of aluminum and 10 g of an ethylene/1-hexene copolymer. The prepolymerized catalyst (2) thus obtained was spherical in shape.

In the following polymerization, the suspension thus obtained was used, as it was.

(Polymerization)

The same polymerization as in Example 1 was repeated except that the suspension of the prepolymerized catalyst (2) as obtained above was used in place of the suspension of the prepolymerized catalyst (1), whereby 416 g of an ethylene/1-butene copolymer was obtained.

The ethylene/1-butene copolymer thus obtained had MFR of 0.7 g/10 min, a density of 0.908 g/cm$^3$, a bulk specific gravity of 0.47 g/cm$^3$, an average particle diameter of polymer of 770 $\mu$m, and a content of particulate polymer having a particle diameter of not more than 100 $\mu$m of 0.01% by weight.

Comparative Example 1

[Preparation of prepolymerized catalyst]

The same procedure as in Example 1 was repeated except that triisobutylaluminum was used in place of the diisobutylaluminum hydride, whereby a prepolymerized catalyst was obtained.

Figure 3:
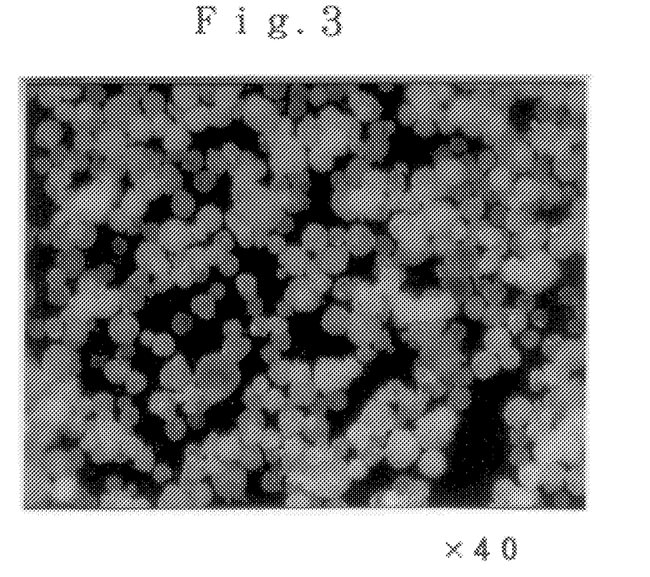
FIG. 3 is a photograph of an optical microscope showing a particle structure of the prepolymerized catalyst (component) obtained in Comparative Example 1.

The prepolymerized catalyst had feather-like projections on its surface, and a photograph of an optical microscope of the catalyst was shown in FIG. 3.

(Polymerization)

Same procedure as in Example 1 was repeated except that the prepolymerized catalyst obtained above was used in place of the prepolymerized catalyst (1), whereby 249 g of an ethylene/1-butene copolymer was obtained.

The thus obtained ethylene/1-butene copolymer had MFR of 0.7 g/10 min, a density of 0.911 g/cm$^3$, a bulk specific gravity of 0.47 g/cm$^3$, an average particle diameter of 580 $\mu$m, and a content of particulate polymer having a particle diameter of not more than 100 $\mu$m of 0.03% by weight.

Example 4

[Preparation of prepolymerized catalyst (3)]

A thoroughly nitrogen-purged 1-liter glass flask was charged with 34.5 g of silica (a product of Fuji Davison Co., adsorbed water; not more than 0.1% by weight; hydroxyl group content; 2.4% by weight) and 500 ml of toluene, and the resulting suspension was cooled to 0° C. To this suspension was added dropwise over a period of 45 minutes while maintaining the temperature within the system at 0° C. 178 ml of a toluene solution (a product of Schering Co., methylaluminoxane (Lot No. TB6.1-373) Al; 1.48 mol/liter) of an organoaluminium oxy-compound. Thereafter, this suspension was heated up to 95° C to react for 20 hours, and the resulting suspension was washed three times with 500 ml of toluene to give 700 ml of a suspension with the addition of toluene.

A 100 ml portion of the thus obtained suspension was poured in a 400 ml glass flask, and 5.7 ml of a toluene solution (Zr; 0.0303 mol/liter) of bis(1-methyl-3-n-butylcyclopentadienyl) zirconium dichloride was added to the glass flask, heated up to 80° C. and the resulting mixture was stirred at 80° C. for 2 hours. This suspension was washed three times with 100 ml of hexane to give 100 ml of a suspension with the addition of hexane.

Successively, this suspension was charged with 1.7 ml of a decane solution (Al; 1.0 mol/liter) of diisobutylaluminum hydride, followed by stirring at room temperature for 2 hours. Subsequently, a supernatant of a suspension was removed, and the suspension was washed two times with 100 ml of hexane to give a suspension again with the addition of 200 ml of hexane.

To this suspension was added 7.2 ml of a decane solution (Al; 1.0 mol/liter) of diisobutylaluminum hydride, and ethylene gas (normal pressure) was introduced continuously thereinto to carry out prepolymerization at 50° C. for 2 hours, whereby a prepolymerized catalyst (3) was obtained. In that case, no adhesion to the reactor wall of the prepolymerized catalyst was observed.

Figure 4:
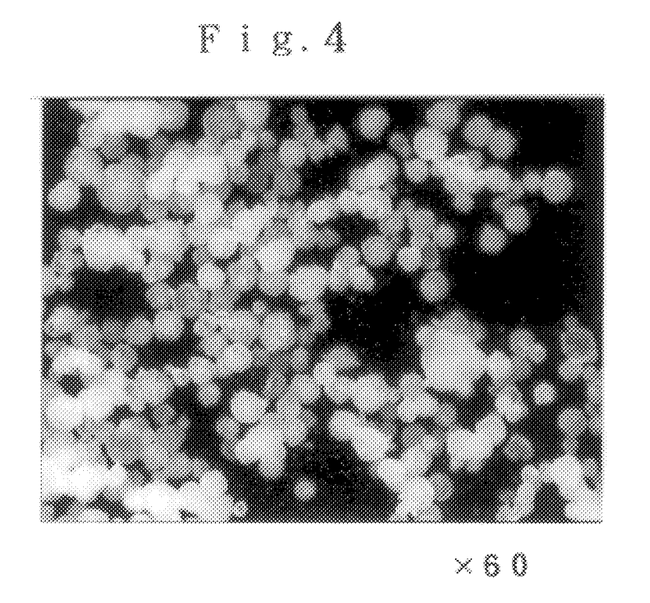
FIG. 4 is a photograph of an optical microscope showing a particle structure of the prepolymerized catalyst (component) obtained in Example 4.

The thus obtained prepolymerized catalyst (3) contained, based on 1 g of silica, 2.3 mg of zirconium, 109 mg of aluminum and 3 g of polyethylene. This prepolymerized catalyst (3) had a smooth surface and a spherical shape. FIG. 4 shows a photograph of an optical microscope of this prepolymerized catalyst.

(Polymerization)

A thoroughly nitrogen-purged 2-liter stainless steel autoclave was charged with 1 liter of hexane, and the system was purged with ethylene gas. Subsequently, 40 ml of 1-hexene was added to the autoclave, and the system was heated up to 70° C. Thereafter, to the autoclave were added 0.75 ml of a decane solution (Al; 1.0 mol/liter) of triisobutylaluminum and 0.005 mmols of the above-obtained prepolymerized catalyst (3) to initiate polymerization.

While feeding ethylene continuously, polymerization was carried out at a total pressure of 8 kg/cm$^2$-G and 80° C. for 1.5 hours to obtain 445 g of an ethylene/1-hexene copolymer.

The thus obtained ethylene/1-hexene copolymer had MFR of 0.12 g/10 min, a density of 0.928 g/cm$^3$, a bulk specific gravity of 0.45 g/cm$^3$, an average particle diameter of polymer of 560 $\mu$m, and a content of particulate polymer having a particle diameter of not more than 100 $\mu$m of 0.02% by weight.

In that case, no adhesion to the autoclave wall of the polymer was observed.

Comparative Example 2

[Preparation of prepolymerized catalyst]

Figure 5:
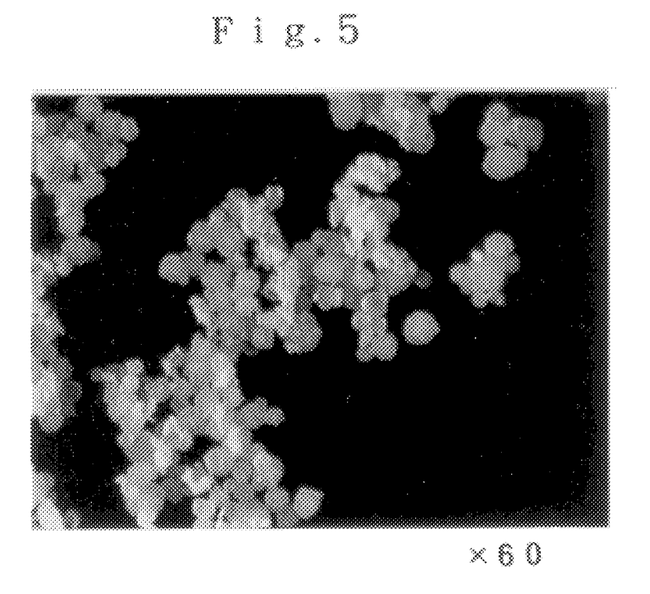
FIG. 5 is a photograph of an optical microscope showing a particle structure of the prepolymerized catalyst (component) obtained in Comparative Example 2.

The same procedure as in Example 4 was repeated except that the diisobutylaluminum hydride treatment was omitted, and triisobutylaluminum was used at the time of prepolymerization, whereby a prepolymerized catalyst was obtained. FIG. 5 shows a photograph of an optical microscope of this prepolymerized catalyst.

The thus obtained prepolymerized catalyst had feather-like projection on its surface and were poor in particle properties.

(Polymerization)

In the same manner as in Example 4, 375 g of an ethylene/1-hexene copolymer was obtained.

The thus obtained ethylene/1-hexene copolymer had MFR of 0.10 g/10 min, a density of 0.927 g/cm$^3$, a bulk specific gravity of 0.44 g/cm$^3$, an average particle diameter of polymer of 580 μm, and a content of particulate polymer having a particle diameter of not more than 100 μm of 0.03% by weight.

Adhesion to the autoclave wall of the polymer was observed.

What is claimed is:

1. An olefin polymerization catalyst comprising
   (I) a prepolymerized olefin polymerization catalyst obtained by
      bringing (D) a silica particulate carrier into contact with (A) an aluminoxane compound,
      bringing the resulting product into contact with (B) a transition metal compound represented by the formula (ii'): $R^3R^4R^5R^6M$ wherein M represents zirconium or hafnium, $R^3$ and $R^4$ each represent a group having a cyclopentadienyl skeleton and can be linked together through an alkylene group, a substituted alkylene group, a silylene group or a substituted silylene group, and $R^5$ and $R^6$ each represent alkyl group, cycloalkyl group, aryl group, aralkyl group, alkoxy group, aryloxy group, trialkylsilyl group, $SO_3R$ group, halogen atom or hydrogen atom, wherein said substituted alkylene group is substituted with 1 or 2 hydrocarbon groups each having 1 to 6 carbon atoms, and wherein said substituted silylene group is substituted with 1 or 2 hydrocarbon groups each having 1 to 6 carbon atoms, and (C) an organoaluminum hydride compound represented by the formula $H_nAlR^7_{3-n}$, wherein $R^7$ represents an alkyl group, a cycloalkyl or aryl group, and n is 1 or 2, wherein said aluminoxane compound (A) is in an amount of 10 to 500 in terms of the atomic ratio (Al/transition metal) of aluminum of said compound (A) to the transition metal of the transition metal compound (B), said transition metal compound (B) is in an amount of $5\times10^{-6}$ to $5\times10^{-4}$ mol, as transition metal based on 1 g of the silica particulate carrier (D), and said organoaluminum hydride compound (C) is in an amount of 0.01 to 3 in terms of the atomic ratio (Al-C/Al-A) of aluminum atom (Al-C) of the compound (C) to aluminum atom (Al-A) of the aluminoxane (A) and
      prepolymerizing ethylene in the presence of the resultant catalyst to obtain said prepolymerized olefin polymerization catalyst containing polyolefin in an amount of 1 to 100 gram based on 1 gram of the particulate carrier; and
   (II) (E) an organoaluminum compound, wherein the organoaluminum compound (E) is contained in an amount of from 3 to 150 mols based on 1 g atom of transition metal in the transition metal compound (B) in said solid catalyst component and
   said organoaluminum compound (E) is selected from the group consisting of:
      the compounds represented by the formula of $R^7_nAlX_{3-n}$ wherein $R^7$ represents a hydrocarbon group of 1–12 carbon atoms, X represents halogen and n is 1–3; and
      from the group consisting of the compounds represented by the formula of $R^7_nAlY_{3-n}$ wherein $R^7$ represents a hydrocarbon group of 1–12 carbon atoms, Y represents $-OR^8$, $-OSiR^9_3$, $-OAlR^{10}_2$, $-NR^{11}_2$, $-SiR^{12}_3$ or $-N(R^{13})AlR^{14}_2$, wherein $R^8$, $R^9$ and $R^{14}$ each represents methyl, ethyl, isopropyl, isobutyl, cyclohexyl, phenyl or trimethylsilyl, $R^{11}$ represents hydrogen atom, methyl, ethyl, isopropyl, phenyl or trimethylsilyl and $R^{12}$ and $R^{13}$ each represents methyl or ethyl, and n is 1–2.

2. The olefin polymerization catalyst of claim 1, wherein the group IVB transition metal is zirconium.

3. The olefin polymerization catalyst of claim 1 wherein organoaluminum compound (E) is a trialkyl aluminum compound.

4. The olefin polymerization catalyst of claim 1 wherein the organoaluminum compound (E) is trisobutylaluminum and the transition metal compound is bis(1-methyl 3-n-butylcyclopentadienyl) zirconium dichloride.

5. The olefin polymerization catalyst of claim 4 wherein the aluminoxane compound is methylaluminoxane.

6. The olefin polymerization catalyst of claim 1, wherein said prepolymerization of ethylene is carried out in the presence of said resultant catalyst and the organoaluminum compound which is used in an amount of from 5 to 200 mols based on 1 g atom of transition metal in the transition metal compound (B).

7. The olefin polymerization catalyst of claim 1, wherein said prepolymerized olefin polymerization catalyst is obtained by:
   bringing (D) a silica particulate carrier into contact with (A) an aluminoxane compound,
   bringing the resulting product into contact with (C) the organoaluminum hydride compound and (B) the transition metal compound in this order, and
   prepolymerizing ethylene in the presence of the resultant catalyst and (E) the organoaluminum compound which is used in an amount of from 3 to 150 mols based on 1 g atom of transition metal in the transition metal compound (B).

8. The olefin polymerization catalyst of claim 1, wherein said prepolymerized olefin polymerization catalyst is obtained by
   bringing (D) a silica particulate carrier into contact with (A) the aluminoxane compound,
   bringing the resulting product into contact with (B) the transition metal compound and the organoaluminum hydride compound (C) in this order, and
   prepolymerizing ethylene in the presence of the resultant catalyst and (E) an organoaluminum compound.

9. The olefin polymerization catalyst of claim 1, wherein the group IV B transition metal is zirconium, the organoaluminum compound (E) is trisobutylaluminum, and the aluminoxane compound is methylaluminoxane.

10. the olefin polymerization catalyst of claim 9, wherein said prepolymerization of ethylene is carried out in the presence of said resultant catalyst and an organoaluminum compound which is used in an amount of from 3 to 150 mols based on 1 g atom of transition metal in the transition metal compound (B).

11. The olefin polymerization catalyst of claim 9, wherein said prepolymerized olefin polymerization catalyst is obtained by:
   bringing (D) a silica particulate carrier into contact with (A) an aluminoxane compound,
   bringing the resulting product into contact with (C) the organoaluminum hydride compound and (B) a transition metal compound in this order, and
   prepolymerizing ethylene in the presence of the resultant catalyst and an organoaluminum compound which is used in an amount of from 3 to 150 mols based on 1 g atom of transition metal in the transition metal compound (B).

12. The olefin polymerization catalyst of claim 9, wherein said prepolymerized olefin polymerization catalyst is obtained by bringing (D) a silica particulate carrier into contact with (A) the aluminoxane compound, bringing the resulting product into contact with (B) the transition metal compound and the organoaluminum hydride compound (C) in this order, and prepolymerizing ethylene in the presence of the resultant catalyst and (E) an organoaluminum compound.

13. The olefin polymerization catalyst of claim 1 wherein the alkylene group of said (B) transition metal compound has 1 to 3 carbon atoms and the alkylene portion of the substituted alkylene group has 1 to 3 carbon atoms.

14. An olefin polymerization catalyst comprising (I) a prepolymerized olefin polymerization catalyst obtained by bringing (D) a silica particulate carrier into contact with (A) an aluminoxane compound, bringing the resulting product into contact with (B) a transition metal compound represented by the formula (ii):

$$ML_x \qquad (ii)$$

wherein M represents zirconium, L represents ligands coordinated with zirconium, two of the ligands L have a cyclopentadienyl skeleton, and L other than the ligands having a cyclopentadienyl skeleton represent hydrocarbon groups of 1–6 carbon atoms, phenyl, halogen atom or hydrogen atom, and x is 4, and wherein the ligands having a cyclopentadienyl skeleton may be substituted with 1 to 5 alkyl groups of 1 to 6 carbon atoms, and the two ligands having a cyclopentadienyl skeleton may be linked together through a group which is selected from the group consisting of ethylene, propylene, isopropylene, dimethylsilylene, diphenylsilylene and methyl-phenyl-silylene, and (C) a dialkylaluminium hydride compound wherein the alkyl group contains 1 to 4 carbon atoms, wherein said aluminoxane compound (A) is in an amount of 10 to 500 in terms of the atomic ratio (Al/transition metal) of aluminum of said compound (A) to the transition metal of the transition metal compound (B), said transition metal compound (B) is in an amount of $5 \times 10^{-6}$ to $5 \times 10^{-4}$ mol, as transition metal based on 1 g of the silica particulate carrier (D), and said organoaluminum hydride compound (C) is in the amount of 0.01 to 3 in terms of the atomic ratio (Al-C/Al-A) of aluminum atom (Al-C) of the compound (C) to aluminum atom (Al-A) of the aluminoxane (A) and prepolymerizing ethylene in the presence of the resultant catalyst to obtain said prepolymerized olefin polymerization catalyst containing polyolefin in an amount of 1 to 100 gram based on 1 gram of the particulate carrier; and II (E) a dialkylaluminum halide compound wherein the alkyl group contains 1 to 4 carbon atoms and wherein the dialkylaluminum halide compound (E) is contained in an amount of from 3 to 150 mols based on 1 g atom of transition metal in the transition metal compound (B) in said solid catalyst component (I).

15. The olefin polymerization catalyst of claim 14 wherein the organoaluminum compound (E) is trisobutylaluminum and the transition metal compound is bis(1-methyl-3-n-butylcyclopentadienyl) zirconium dichloride.

16. The olefin polymerization catalyst of claim 14, wherein said prepolymerization of ethylene is carried out in the presence of said resultant catalyst and the organoaluminum compound (E) which is used in an amount of from 5 to 200 mols based on 1 g atom of transition metal in the transition metal compound (B).

17. The olefin polymerization catalyst of claim 14, wherein said prepolymerized olefin polymerization catalyst is obtained by:

bringing (D) the silica particulate carrier into contact with (A) the aluminoxane compound, bringing the resulting product into contact with (C) the organoaluminum hydride compound and (B) the transition metal compound in this order, and prepolymerizing ethylene in the presence of the resultant catalyst and (E) the organoaluminum compound which is used in an amount of from 3 to 150 mols based on 1 g atom of transition metal in the transition metal compound (B).

18. The olefin polymerization catalyst of claim 14, wherein said prepolymerized olefin polymerization catalyst is obtained by bringing (D) the silica particulate carrier into contact with (A) the aluminoxane compound, bringing the resulting product into contact with (B) the transition metal compound and (C) the organoaluminum hydride compound in this order, and prepolymerizing ethylene in the presence of the resultant catalyst and (E) the organoaluminum compound.

19. The olefin polymerization catalyst of claim 14, wherein the transition metal compound is bis(1-methyl-3-n-butylcyclopentadienyl)-zirconium-dichloride, the organoaluminum compound (E) is trisobutylaluminum, and the (A) aluminumoxane compound is methylaluminoxane.

20. The olefin polymerization catalyst of claim 19, wherein said prepolymerization of ethylene is carried out in the presence of said resultant catalyst and the organoaluminum compound which is used in an amount of from 3 to 150 mols based on 1 g atom of transition metal in the transition metal compound (B).

21. An olefin polymerization catalyst comprising (I) a prepolymerized olefin polymerization catalyst obtained by bringing (D) a silica particulate carrier into contact with (A) an aluminoxane compound, bringing the resulting product into contact with (B) transition metal compound bis(1-methyl-3-n-butylcyclopentadienyl)-zirconium-dichloride, and (C) dialkylaluminum hydride compound diisobutylaluminum hydride, wherein said aluminoxane compound (A) is in an amount of 10 to 500 in terms of the atomic ratio (Al/transition metal) of aluminum of said compound (A) to the transition metal of the transition metal compound (B), said transition metal compound (B) is in an amount of $5 \times 10^{-6}$ to $5 \times 10^{-4}$ mol, as transition metal based on 1 g of the silica particulate carrier (D), and said dialkylaluminum hydride compound (C) is in an amount of 0.01 to 3 in terms of the atomic ratio (Al-C/Al-A) of aluminum atom (Al-C) of the compound (C) to aluminum atom (Al-A) of the aluminoxane (A) and prepolymerizing ethylene in the presence of the resultant catalyst to obtain said prepolymerized olefin polymerization catalyst containing polyolefin in an amount of 1 to 100 gram based on 1 gram of the particulate carrier; and (II) (E) a trialkylaluminum compound which is trisobutylaluminum wherein the trialkylaluminum compound (E) is contained in an amount of from 3 to 150 mols based on 1 g atom of transition metal in the transition metal compound (B) in said solid catalyst component (I).

22. The olefin polymerization catalyst of claim 21, wherein said prepolymerization of ethylene is carried out in the presence of said resultant catalyst and the organoaluminum compound (E) which is used in an amount of from 5 to 200 mols based on 1 g atom of transition metal in the transition metal compound (B).

23. The olefin polymerization catalyst of claim 21, wherein said prepolymerized olefin polymerization catalyst is obtained by:

bringing (D) the silica particulate carrier into contact with (A) the aluminoxane compound, bringing the resulting product into contact with (C) the organoaluminum hydride compound and (B) the transition metal compound in this order, and prepolymerizing ethylene in the presence of the resultant catalyst and (E) the organoaluminum compound which is used in an amount of from 3 to 150 mols based on 1 g atom of transition metal in the transition metal compound (B).

24. The olefin polymerization catalyst of claim 21, wherein said prepolymerized olefin polymerization catalyst is obtained by bringing (D) the silica particulate carrier into contact with (A) the aluminoxane compound, bringing the resulting product into contact with (B) the transition metal compound and (C) the organoaluminum hydride compound in this order, and prepolymerizing ethylene in the presence of the resultant catalyst and (E) the organoaluminum compound.

25. The olefin polymerization catalyst of claim 21, wherein the transition metal compound is bis(1-methyl-3-n-butylcyclopentadienyl)-zirconium-dichloride, the organoaluminum compound (E) is trisobutylaluminum, and the (A) aluminumoxane compound is methylaluminumoxane.

26. The olefin polymerization catalyst of claim 25, wherein said prepolymerization of ethylene is carried out in the presence of said resultant catalyst and the organoaluminum compound which is used in an amount of from 3 to 150 mols based on 1 g atom of transition metal in the transition metal compound (B).

* * * * *